UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

METHOD OF WATER PURIFICATION.

1,121,994. Specification of Letters Patent. Patented Dec. 22, 1914.

No Drawing. Application filed August 7, 1914. Serial No. 855,584.

*To all whom it may concern:*

Be it known that I, CARLETON ELLIS, a citizen of the United States, and a resident of Montclair, in the county of Essex and State of New Jersey, have invented certain new and useful Improvements in Methods of Water Purification, of which the following is a specification.

This invention relates to water purification and especially to the removal of small quantities of gasolene and the like from wash water discharged into sewers, and also is concerned with the treatment of such wash waters as to render the same substantially free from inflammable material or substances yielding explosive mixtures with air.

Much trouble has arisen in large cities from the frequent explosions occurring in sewers due to gasolene emanating from the wash waters of garages, where small amounts of gasolene are used to assist in the removal of grease, etc., from automobiles. As a rule only a pint or so of gasolene is used on each automobile and the washing operation may require as much as 100 gallons of water per car, hence the gasolene in the wash waters is in very small proportion, usually considerably less than one per cent. The wash water contains soap of a water-soluble character and more or less lime soap and the like which acts as a clogging element especially with oil and gasolene often forming a jelly which causes trouble in the drains, traps, separators, etc. A number of types of separators have been proposed based on the difference in gravity of gasolene and water, but as the former is usually well emulsified with the latter the gravity process is unreliable.

By my invention the water containing gasolene and soap, etc., or whatever may be the composition of the wash waters from the garage is passed through a bed of porous material of an absorptive nature or similar material, including for example, sawdust which has been impregnated with oil and the like, while pumice, infusorial earth, peat and various other bodies may likewise be used.

A useful composition is obtained by taking ordinary sawdust of say 10 to 20 mesh, wetting with mineral oil, anthracene oil or other oily material or gasolene absorbing medium, and forming this into a filter bed through which the wash waters are passed. Preferably the sawdust is merely moistened or dampened with the oil so that no excess of oil is present or any such amount as could be squeezed out to any great extent by say pressure of the hands. Thus the sawdust is waterproofed to a large degree and offers a large surface of an oily character which selectively absorbs gasolene and the like while permitting the water to run through freely.

Instead of having a filter bed, the oiled sawdust may be agitated with the wash-water, preferably in some form of continuous agitator with subsequent separation if desired of the water and sawdust in some form of continuous separator. The filter bed type of apparatus is however preferable in many cases as it is simple and cheap and may be made for example in the form of a cylindrical vessel or barrel into which may be inserted trays of oiled sawdust resting on a screen bottom. The bottoms of the trays being perforated, the water runs through the layer of sawdust and tray and is then passed on to the sewer or otherwise handled. Various modifications of the apparatus may of course be made. The trays should preferably be readily removable so that as soon as a tray of the sawdust becomes charged with gasolene it may be removed and be replaced by a tray of fresh material. The spent material may be used as a fuel or the oils and greases which it contains may be recovered in any suitable manner, and used over again.

The sawdust employed preferably is fairly coarse to allow free passage of water and to permit of the accumulation of more or less lime soap before any material decrease in the flow of water takes place. The oil may be added by means of a sprayer fitted in an agitator in which the sawdust is constantly tumbled while the oil is sprayed upon it. An oil of 32° Baumé or any spindle, neutral or similar non-volatile oil, etc., is suitable, in fact very low grades of oil such as fuel oil, flux, etc., may be used. The sawdust will take 20 to 40% more or less of oil to good advantage.

The wash water from the automobile is first preferably passed through a sand separator which removes sand and heavy dirt, etc., while the light dirt such as the dust over the surface of the body of the car is carried on in suspension and is to a certain extent collected in the oiled bed, depending on the thickness and fineness of the sawdust or other material comprising said bed. Ordinarily the bed of sawdust need be only a few inches in depth to remove the gasolene from a rapidly flowing stream of water but to remove all suspended material may require a deeper bed. The water running from a well operated bed does not contain a sufficient amount of gasolene to form explosive mixtures with air and in fact the gasolene appears to be completely removed under efficient conditions of operation.

What I claim is:—

1. The process of treating wash water containing traces of gasolene which comprises passing same through a bed of oiled sawdust.

2. The process of treating wash water containing traces of gasolene which comprises passing same through a bed of oiled porous material.

3. The process of treating wash water containing traces of gasolene or other highly-inflammable products which comprises contacting the said wash water with oiled porous material.

4. The process of treating garage wash-water containing traces of gasolene, which comprises contacting the said wash water with oiled sawdust.

5. The process of treating wash water containing small amounts of gasolene or other highly-inflammable products, which comprises passing said wash water through a bed of substantially porous material impregnated with a substantially non-volatile oil.

6. The process of treating wash water containing small amounts of gasolene or other highly inflammable products, which comprises passing said wash water through a bed of sawdust impregnated with a substantially non-volatile oil.

7. The process of treating wash water containing traces of gasolene or other highly-inflammable products, which comprises passing the wash water through a dirt separator and subsequently contacting the wash water with oiled porous material.

8. The process of treating water such as wash water containing traces of gasolene or other highly-inflammable products which comprises contacting the water with oily material carried on a suitable support.

9. The process of treating water containing small amounts of gasolene or other substantially water-immiscible organic solvent material, which comprises contacting water of this character with oily material capable of absorbing such solvent material, said oily material being carried on a suitable support.

10. The process of treating wash water containing small amounts of gasolene or other highly-inflammable products, which comprises passing said wash water through a bed of pervious material comprising a non-volatile solvent for such highly-inflammable products, whereby the latter are substantially retained and the wash water is rendered safe for discharge into sewers.

11. The process of treating garage wash waters containing traces of gasolene which comprises passing the wash waters through a sand and heavy dirt separator and then passing the said wash waters through a bed of oiled porous material.

Signed at Montclair in the county of Essex and State of New Jersey this 5th day of August A. D. 1914.

CARLETON ELLIS.

Witnesses:
JOEL STARRELS,
A. A. WELLS.

Copies of this patent may be obtained for five cents each, by addressing the "Commissioner of Patents, Washington, D. C."